United States Patent [19]

Von Holdt

[11] 4,308,970
[45] Jan. 5, 1982

[54] PLASTIC BUCKET DEFINING ANNULAR INWARDLY PROJECTING RIDGE

[76] Inventor: John W. Von Holdt, 7430 N. Croname Rd., Niles, Ill. 60648

[21] Appl. No.: 101,220

[22] Filed: Dec. 7, 1979

Related U.S. Application Data

[63] Continuation-in-part of Ser. No. 963,736, Nov. 27, 1978, Pat. No. 4,210,258.

[51] Int. Cl.³ .............................................. B65D 39/00
[52] U.S. Cl. ..................................... 220/306; 220/307
[58] Field of Search ................ 220/306, 307; 206/508; 150/5

[56] References Cited

U.S. PATENT DOCUMENTS 4,210,258 7/1980 Von Holdt ........................ 220/306
4,256,240 3/1981 Woinarski ........................ 220/306

Primary Examiner—George T. Hall
Attorney, Agent, or Firm—Charles F. Pigott, Jr.; Garrettson Ellis

[57] ABSTRACT

A plastic bucket having a lip which defines means for engaging a bucket lid in sealing relation. The interior wall of the bucket defines an annular, inwardly projecting ridge spaced from the lip. The ridge extends around the inner circumference of the bucket, and defines an annular, inwardly pointed apex, to provide increased hoop strength to the bucket adjacent to its mouth and to provide an internal brush wiping member within the bucket.

19 Claims, 7 Drawing Figures

PLASTIC BUCKET DEFINING ANNULAR INWARDLY PROJECTING RIDGE

CROSS-REFERENCE TO RELATED APPLICATION

This application is a continuation-in-part of U.S. application Ser. No. 963,736, filed Nov. 27, 1978; now U.S. Pat. No. 4,210,258.

BACKGROUND OF THE INVENTION

In the application cited immediately above, lids for paint buckets and cans are disclosed which may be removed by prying an outer flange of the lid off of the bucket lip with a screwdriver or the like in an easy manner, yet which, when locked on the bucket lip, are very resistant to accidental opening due to shock of dropping or the like.

In accordance with this present invention, an improved bucket is disclosed, which bucket may be used in conjunction with lids of the type disclosed in previous application, or with other lids as well, to obtain improved, sealed containers for paint or other materials, which particularly may have the advantage of being processable on the current, industrial automated paint can filling and sealing machinery. At the same time, the same major advance of sealing strength of the joined bucket and lid as found in the previously cited application may be achieved in accordance with this invention.

DESCRIPTION OF THE INVENTION

In this invention, a plastic bucket is provided having a lip at its mouth, with the lip defining means for engaging a bucket lid in sealingly secured relation to the lip.

In accordance with this invention, the interior wall of the bucket defines an annular, inwardly projecting ridge positioned adjacent to but spaced from the lip. The ridge extends around the inner circumference of the bucket, and defines an annular, inwardly pointed apex. Advantages of this are to provide increased hoop strength to the bucket adjacent to its mouth, while at the same time the annular ridge can be utilized as an antisplashing and an internal brush wiping member within the bucket, which can greatly reduce the spillage of paint or the like from the bucket during use.

Preferably, the annular apex is positioned less than one inch from the outermost portion of the bucket's lip, typically about one quarter inch or so. It is also preferable for the annular apex to be thin enough to be characterized as essentially linear, for improved brush wiping characteristics.

Furthermore, the surfaces of the inwardly-projecting ridge extending from the annular apex to the interior wall of the bucket are preferably concave in shape, especially the surface between the apex and the bucket lip.

The lid used on the bucket preferably defines first and second transversely positioned annular walls forming an annular, open depression, with the second annular wall defining the outer limit of the depression. The first annular wall defines the inner limit of the depression, and is preferably an integral segment of the bucket lid, being connected at opposed sides to other portions of the bucket lid.

A third annular wall of the lid may be positioned outwardly from the second annular wall, with the second and third annular walls, in turn, defining between them an annular locking slot which receives and holds the lip of the bucket. The second wall also may carry an outwardly positioned annular projection defining a surface which faces the annular locking slot and which may define an angle (for example about 80° to 100°) to the plane of the second annular wall. This annular projection is intended for contacting and retaining relation with a mating projection of the bucket lip positioned within the locking slot.

The second wall also defines, below the outwardly-positioned annular projection, a surface which is of a shape complimentary to the shape of the side of the annular ridge which faces the mouth of the bucket. As a result of this, an annular abutting, sealing surface may be formed between the upper side of the ridge and the second wall, extending essentially to the annular apex, for improved sealing of the container.

Also, the third annular wall may define an inwardly positioned projection adapted to interlock with an outwardly facing projection of the bucket lip, positioned within the locking slot, for additional sealing of the two components.

It is also preferred for the first annular wall of the bucket lid to be adapted for preferentially flexing upon stress or shock adjacent to the bucket lip, as described in the previously cited application, with the result that the second annular wall can remain relatively immovable under such circumstances for improved sealing strength.

The second annular wall may be thicker than the first annular wall, which assists the preferential flexing of the first wall.

Preferably, the mating surface of the second wall bearing against the inwardly-projecting ridge is of convex shape to match the preferably concave shape of the upper side of the inwardly-projecting ridge.

Furthermore, if desired, the bucket lip can also define an annular, outwardly projecting ridge extending around the outer circumference of the bucket lip, and defining an annular, outwardly pointing apex. A surface of the bucket lip may extend outwardly relative to the direction of the bucket mouth from said apex, being of generally planar, annular shape. The generally planar, annular surface of the outer end of the bucket lip is preferably free of mold parting line marks for improved sealing characteristics, with the mold parting line being preferably positioned at the outwardly-pointing annular apex of the bucket lip. This improves the sealing characteristics of the container, and is rendered possible because the shape of the generally planar annular surface, and the inner surface of the bucket lip may be appropriately proportioned to facilitate their removal from a mold, even though the parting line is positioned at the annular outwardly-pointing apex.

As a further aspect of this invention, apparatus for removing of molded bucket from a mold core is disclosed, which comprises pusher means for pressing against the bucket interior and optional pneumatic means for pressurizing the bucket interior to facilitate its longitudinal removal from the core.

In accordance with this invention, pressurized fluid supply means are provided, along with channel means communicating through the mold core between the pressurized fluid supply means and the inwardly-projecting annular ridge of a bucket as previously described. Thus, a supply of pressurized fluid is provided to circumferentially expand the plastic bucket adjacent the ridge, to facilitate its removal from the core by the pusher means and pneumatic pressure.

The pressurized fluid supply channel means is of sufficiently narrow dimension to prevent the inflowing of liquid molding compound into it during the molding operation. For example, the fluid supply channel means may have a width essentially of 0.0005 to 0.002 inch.

Referring to the drawings, FIGS. 1 and 2 are perspective views of differing buckets and lids utilizing this present invention.

Figure 1:
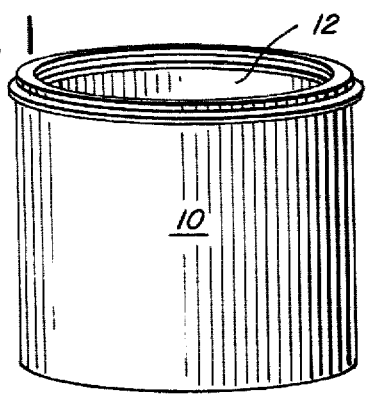

Referring to FIG. 1, a straight-walled bucket 10, suitable for processing with industrial paint bucket filling machinery, is shown, carrying a lid 12. Both bucket 10 and lid 10 are made of single, molded pieces of thermoplastic material.

Figure 2:
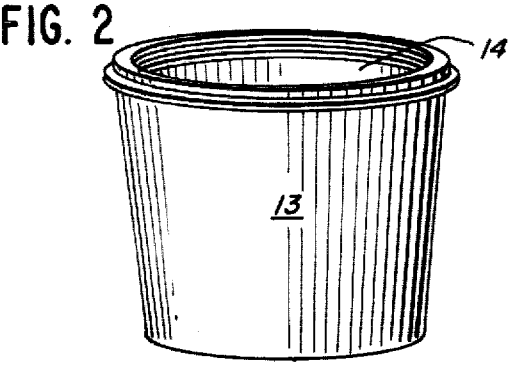

Alternatively, this invention can be used as shown in FIG. 2 with a tapered bucket 12 and its lid 14 which, along with the bucket of FIG. 1, can be made to any of the designs of bucket lip and closure system disclosed herein, or designs equivalent thereto.

Figure 3:
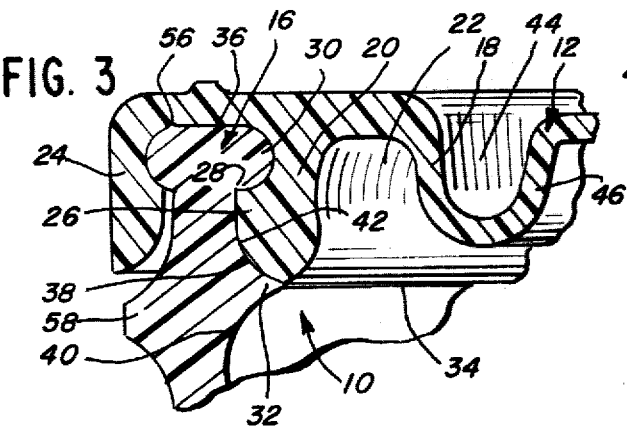
FIG. 3 is an enlarged, fragmentary, longitudinal sectional view of a portion of the bucket and lid in accordance with FIG. 1.

Referring to FIG. 3, the design of bucket closure utilizes the principles of the previously-cited application Ser. No. 963,736, although lid 12 is shown to be free of the optional radial vanes in the specific embodiments disclosed therein, since for the specific embodiment disclosed, for use as a paint bucket, such vanes are not found to be required.

Bucket 10 defines an annular lip 16, having an enlarged upper end as shown.

Lid 12 defines first annular wall 18 and second annular wall 20 which, in turn, defines annular open depression 22 in which the radial vanes may be added if desired.

A third annular wall 24 of lid 12 may be positioned outwardly from second annular wall 20, which wall, in turn, defines with wall 20 the annular locking slot in which lip 16 is shown to reside, with lip 16 being received and held therein.

Second wall 20 also carries the outwardly-positioned annular projection 26, defining a surface 28 which faces annular locking slot 16, and which may desirably define an angle of essentially 80° to 100° to the plane of second annular wall 20. This annular projection 28 is shown to be in contacting and retaining relation with mating projection 30 of bucket lip 16, positioned within the locking slot.

In accordance with this invention, bucket 10 defines an annular, inwardly projecting ridge 32, positioned adjacent to but spaced from lip 16. Ridge 32 extends around the inner circumference of bucket 10 and defines an annular, inwardly pointed apex 34. As stated previously, ridge 32 provides hoop strength to the bucket adjacent its mouth, and provides an internal brush-wiping member within the bucket.

Furthermore, annular ridge 32 serves as a splash guard to inhibit the splashing of the contents of the open bucket 10 out of the mouth thereof, since inwardly projecting ridge 32 tends to direct any slashing or splashing paint radially inwardly toward the center of the bucket where it can fall back and rejoin the bucket contents without spilling. Specifically, the apex 34 of ridge 32 may be positioned about ⅛ or 3/16 inch from the upper surface 36 of bucket lip 16.

Surfaces 38, 40 of annular ridge 32 are preferably concave, surface 38 being shaped to match the corresponding surface 42 of second wall 20, positioned below the surface 28 of the annular projection to provide an annular, mating, sealing surface between walls 38, 42, preferably extending essentially to apex 34. Accordingly, an extensive seal is provided between bucket lip 16 and lid 12, beginning adjacent to apex 34 and extending through the cross sectional area about the surface of lip 16 up to and beyond the top surface 36 of lip 16. As the result of this, the bucket and lid of this invention provide excellent sealing characteristics, while at the same time exhibiting great resistance to accidental removal of the lid by shock imparted through dropping of the bucket or the like.

First wall 18 may define the outer part of an annular depression 44, with annular innermost wall 46 defining the inner wall of the depression 44. Accordingly, upon application of stress force to the bucket and lid of FIG. 3, wall 18 preferentially flexes, absorbing the shock force without displacement of wall 20 or wall 24, so that the seal of the bucket lip 16 remains intact.

Preferably, the second annular wall 20 of lid 12 is of greater thickness than first annular wall 18, which facilitates the selective flexing of first annular wall 18 upon application of shock to the closed bucket lid, while walls 20 and 24 remain in relatively rigid, gripping relation to bucket lip 16.

Figure 4:
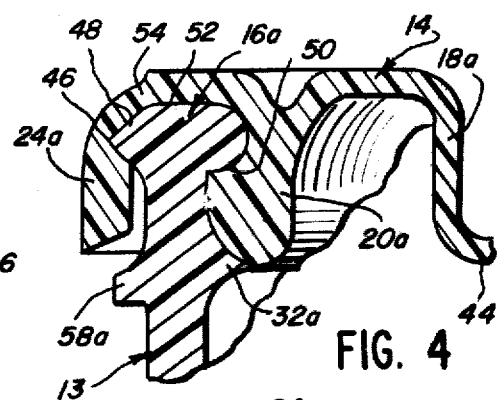
FIG. 4 is an enlarged, fragmentary, longitudinal sectional view of the bucket and lid of FIG. 2.

Referring to FIGS. 2 and 4, a tapered bucket 13 is shown, in contrast to straight walled bucket 10, as well as a modification of the closure of this invention. Nevertheless, either type of closure, or further modification thereof, may be used interchangeably on straight-walled or tapered buckets.

As in the previous embodiment of FIG. 3, FIG. 4 shows a bucket defining a lip 16a, with bucket lid 14 attached thereto. Lid 14 defines first wall 18a and second wall 20a of shape similar to the previous embodiment, with the exception that the central portion 44 of lid 14 remains in depressed relationship relative to the peripheral portion of lid 14 shown in FIG. 4, because no wall corresponding to wall 46 is present. This optional variation still provides wall 18a, which can selectively flex in a preferential manner to wall 20a, but with the bulk of the lid at the central portion 44 occupying a plane including a lower portion of wall 20a rather than an upper portion of the corresponding wall 20 as in FIG. 3.

Third annular wall 24a is provided for a similar function as in the previous embodiment. Annular, inwardly projecting ridge 32a may be of similar design and purpose as annular ridge 32.

In this embodiment, bucket lip 16a defines an outwardly-pointing annular ridge 46, which terminates in an outwardly pointing annular apex indicated at the same reference numeral. The surface 48 of the bucket lip, which extends outwardly from apex 46 relative to the direction of the bucket mouth, defines a generally planar annular surface which is adapted, relative to the shape of the inner surface 50 of bucket lip 16a, to permit the parting line for the bucket lip to be located at a position other than the generally planar surface 48 and the outer end 52 of bucket lip 16a. Specifically, the parting line created on bucket lip 16a by the mold in which it is manufactured may be located at apex 46, so that the annular surfaces 48 and 52 can be smooth and unblemished for maximal sealing characteristics of section 54 of bucket lid 14, bearing tightly against surfaces 48 and 52.

In the embodiment of FIG. 3, parting line 56 is often placed on bucket lip 16 as an annular line at the outer end 36 of lip 16. It may be more desirable in many circumstances to move the parting line to annular apex 46, while the specific shape of bucket lip 16a facilitates the easy and reliable removal of lip 16a from its mold, even when the parting line is located away from the outer end of lip 16a, for example, at apex 46.

Annular projections 58, 58a on the exterior of buckets 10, 13, adjacent the respective lips, are provided as a barrier to abut against the respective outer walls 24, 24a in the event of heavy flexing of the container, to serve as an added support member against pop-off of the lid.

Figure 5:
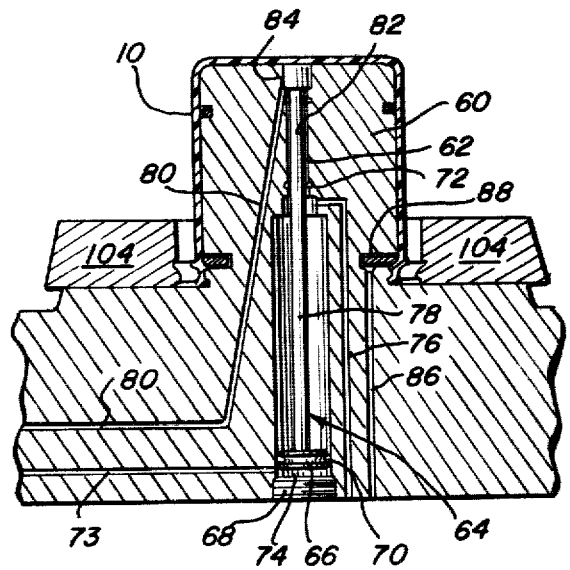
FIG. 5 is a longitudinal sectional view of a mold core for the manufacturing of the bucket of FIG. 1, shown in the configuration where the bucket has been newly-formed on the mold core.
Figure 6:
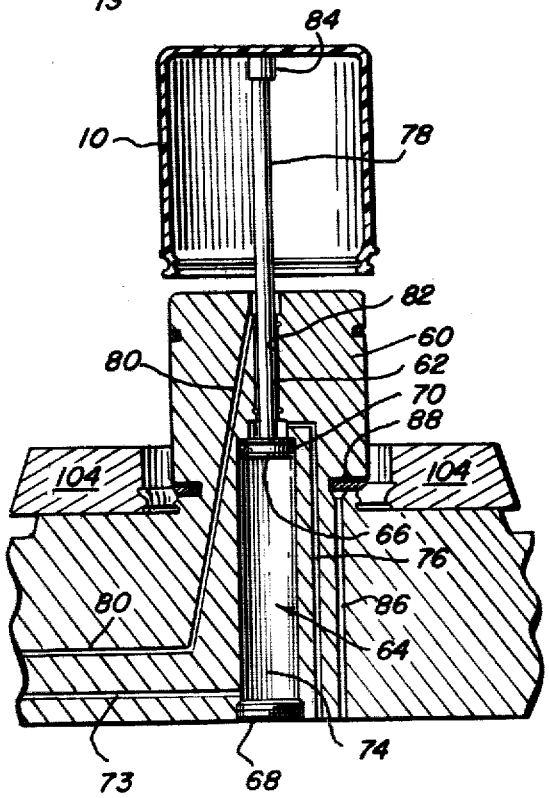
FIG. 6 is a longitudinal sectional view of the mold core and bucket of FIG. 5, showing the bucket in the process of being removed from the mold core.
Figure 7:
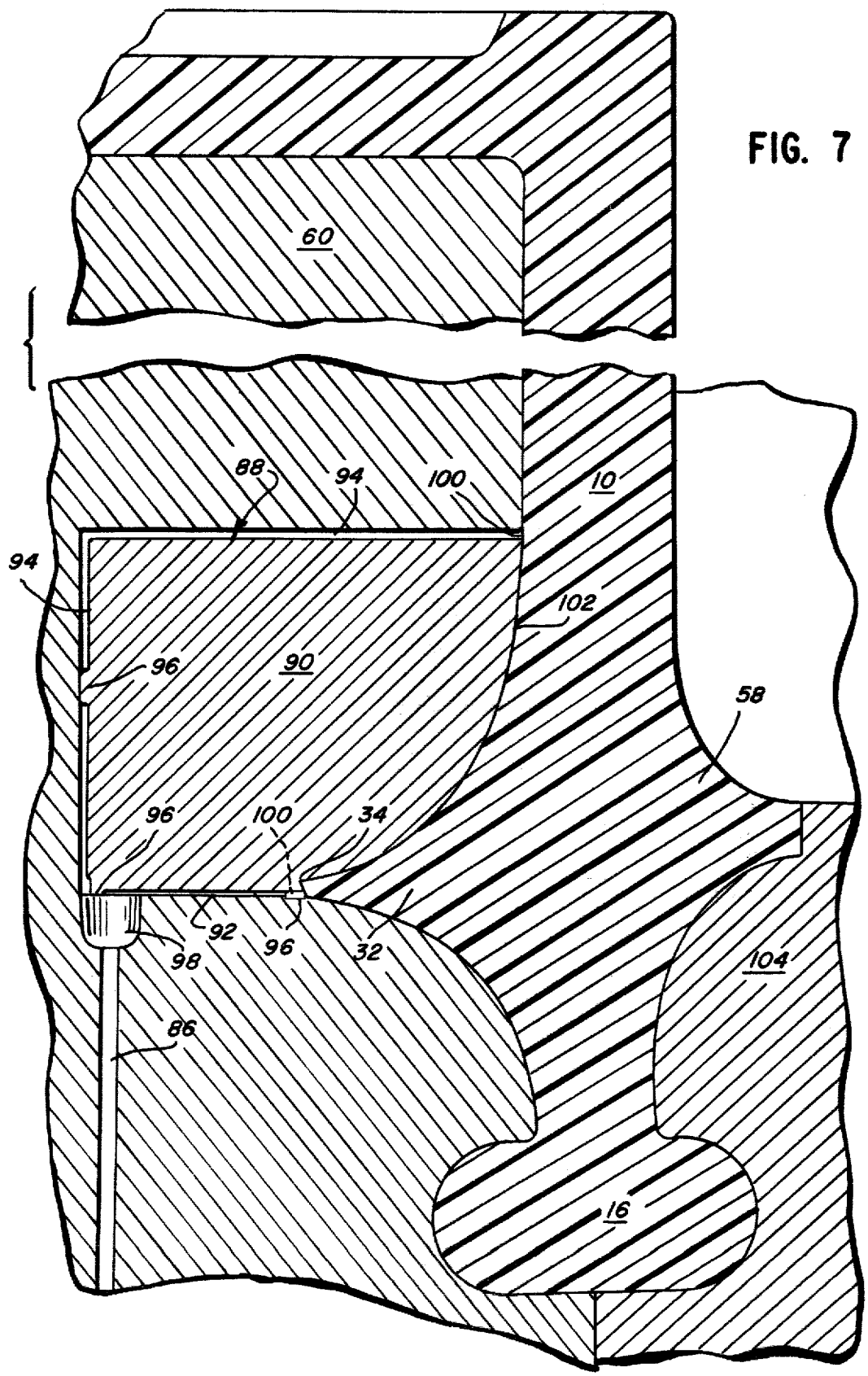
FIG. 7 is a greatly enlarged longitudinal sectional view, showing the lip of the bucket of this invention and its relationship with the mold core.

Referring to FIGS. 5 through 7, mold core apparatus for the manufacture of particularly a straight-walled bucket such as bucket 10 of this invention is shown. The corresponding mold which surrounds mold core 60 during the molding operation is not shown, but may be of conventional design.

A pneumatic bucket removal means is shown, in which ridge 32, 32a of a straight-walled bucket serves as a pressure-maintaining gasket impinging against the mold core as the bucket is removed therefrom by pressured air.

Mold core 60, which has separated from a mold cavity half, exposes the freshly-molded bucket 10 positioned about its exterior.

Pusher means 62 comprises a shaft for pressing against the bucket interior, for assisting in removal of the bucket from core 60. As shown, shaft 62 may be only about ⅜ of an inch in diameter and serves to assure the proper removal of the bucket from the core in automated operation. A great portion of the removing force is provided by pneumatic means as described below.

Shaft 62 reciprocates in a chamber 64 defined in mold core 60, with the inner end of shaft 62 defining a piston head 66. Chamber 64 is closed at its lower end by means of seal 68.

O-rings 70, 72 are provided respectively about the periphery of piston member 66, and shaft 62 at the upper end of chamber 64.

Inlet air pressure line 73 communicates with the lower portion 74 of chamber 64, to impel rod 62 outwardly by pressurized air, forcing bucket 10 off of mold core 60. Pressurized air conduit 76 is provided to cause piston 66 and shaft 62 to withdraw by pressurization of upper portion 78 of chamber 64, so that shaft 62 can reciprocate back and forth for bucket molding removal operation.

Pneumatic line 80 communicates with cylindrical channel 82 in mold core 60, in which shaft 62 reciprocates. The upper portion 84 of rod 62 is positioned in closer tolerance to the diameter of channel 82 than the lower portion, so that sealing action against the pressurized air from conduit 80 is provided when rod 62 is in its retracted position. However, when rod 62 begins to advance, a larger flow conduit for air from line 80 is thus provided, to flow into the space between bucket 10 and mold core 60. The pressurized air tends to urge the bucket to slide outwardly off of the mold core.

Fourth pneumatic line 86 communicates with an annular recess 88 in mold core 60, which recess is positioned to receive the annular inwardly extending ridge 32 of bucket 10 as shown in FIG. 7. Annular recess 88 contains a ring member 90, which may be a split ring made of material cut away from the remainder of core 60 to make the annular recess 88 in the first place, and then reattached. Split ring 90 is reattached within annular recess 88 to define flow paths 92, 94 about the inner peripheries of split ring 90, with flow paths 92, 94 being preferably generally annular in shape, with the exception of necessary support members 96, which are intermittently positioned to support and carry split ring 90, with the flow paths 92, 94 surrounding support member 96 to permit free flow of air through the flow paths about the support members 96.

Preferably, annular flow channels 92, 94 have a width or thickness of essentially 0.0005 to 0.002 inch, typically 0.001 inch, with their optimum thickness depending upon the viscosity of the molding compound and the pressure of molding. It is preferred to select a thickness which is sufficient to allow the flow of air into the inner surface area 102 of bucket 10 while at the same time being sufficiently narrow that molding compound is incapable of flowing significantly into the air supply channels 92, 94 during the molding process.

Accordingly, to facilitate the removal of lip 16 of bucket 10 from the mold core, pressurized air can pass through conduit 86 into annular manifold 98, from where it can flow into generally annular flow paths 92, 94 about the inner peripheries of split ring 90. From there, the air enters into contact at apertures 100 with the inner surface of bucket 10 providing flowing pressurized air to the general area of inner bucket surface 102 which abuts split ring 90 and related portions of mold core 60.

Split molding ring 104 (FIG. 5), which is utilized in the molding process for the formation of the outer surface of lip 16 of the bucket 10, is retracted during the bucket removal step of the molding operation, as shown in FIG. 5. Accordingly, upon pressurization of flow channels 92 and 94, lip 16 and inner annular projection 32 of bucket 10 can be forced outwardly by stretching through the action of the pulse of pressurized air. At the same time, as shown in FIG. 6, pressurized air passing through line 80 blows bucket 10 outwardly off of the mold core, with facilitated action since lip 16 and annular projection 32 are at least partially out of the annular recesses of the mold core which defines them during the molding process.

Typically, the air pressure in each of lines 73, 76, 80 and 86 may range between 80 to 120 psi., with a typical pressure being about 100 psi. However, the respective pressures of each line may be adjusted as desired for optimum results in each specific molding situation.

While a large variety of molding compounds may be used in accordance with this invention, one specific and successful molding compound is the polyethylene resin sold by the Dow Chemical Company as No. 12065. If desired, from two to six percent by weight of a microbead glass filler may be added for strengthening of the resin material.

In accordance with this invention, a plastic bucket is provided having an annular inwardly projecting ring near its lip which serves both as a splash retarding ring and a brush wiping member, and also serves to increase the hoop strength of plastic buckets. By this invention, these buckets may be easily molded on a non-collapsible core, even when the buckets are of straight-walled characteristics, using a simple, non-collapsible core if desired for efficient, rapid molding operation with a mold that needs little maintenance.

The above has been offered for illustrative purposes only, and is not intended to limit the invention of this application, which is as defined in the claims below.

That which is claimed is:

1. A plastic bucket having a lip at its mouth, said lip defining means for engaging a bucket lid in sealingly secured relation to said lip, the improvement comprising, in combination:

the interior wall of said bucket defining an annular, inwardly projecting ridge positioned adjacent to but spaced from said lip, said ridge extending around the inner circumference of said bucket and defining an annular, inwardly-pointed apex, to provide increased hoop strength to said bucket adjacent its mouth.

2. The bucket of claim 1 in which said annular apex is positioned less than one inch from the outermost portion of the bucket lip, and said annular apex is essentially linear.

3. The bucket of claim 2 in which the surfaces of said inwardly-projecting ridge extending from the annular apex to the interior wall of the bucket are concave in shape.

4. A plastic bucket having a lip at its mouth, a plastic bucket lid in sealingly secured relation to the lip of said bucket, the improvement comprising, in combination: the interior wall of said bucket defining an annular, inwardly-projecting ridge positioned adjacent to but spaced from said lip, said ridge extending around the inner circumference of said bucket and defining an annular, inwardly-pointed apex, said lid defining first and second transversely extending annular walls forming an annular open depression, said second annular wall defining the outer limit of said depression, said first annular wall defining the inner limit of said depression and constituting an integral segment of the bucket lid, being connected at opposed sides to other portion of the bucket lid, and a third transversely-extending annular wall positioned outwardly from said second annular wall, said second and third annular walls, in turn, defining between them an annular locking slot which receives and holds the lip of said bucket, said second wall also carrying an outwardly-positioned annular projection defining a surface which faces the annular locking slot and which defines an angle to the plane of said second annular wall, said annular projection being in contacting and retaining relation with a mating projection of said bucket lip positioned within the locking slot, the second wall also defining, below said outwardly-positioned annular projection, a surface which is of a shape complimentary to the shape of the side of said annular ridge which faces the mouth of said bucket, to form an annular, abutting sealing surface between said outer side of the ridge and the second wall and extending essentially to said apex, said third annular wall defining an inwardly-positioned projection adapted to interlock with an outwardly facing projection of said bucket lip, positioned within the locking slot, said first annular wall being adapted for preferentially flexing upon shock adjacent the bucket lip, causing said second wall to remain relatively immovable under such circumstances for improved sealing strength.

5. The bucket of claim 4 in which the surface of said inwardly-projecting ridge extending from the annular apex to the interior wall and facing said bucket mouth is concave in shape, and the mating surface of said second wall of the bucket lid is correspondingly convex in shape.

6. The plastic bucket and lid of claim 4 in which said first wall of the bucket lid defines the outer surface of an annular groove defined in said lid.

7. The bucket and lid of claim 4 in which said lip of the bucket defines an outwardly pointing annular ridge terminating in an outwardly-pointing annular apex, a surface of said bucket lip which extends outwardly, relative to said bucket mouth, defining a generally planar annular surface, adapted relative to the shape of the inner surface of said bucket lip to permit the parting line for said bucket lip to be located at a position elsewhere than said generally planar surface and the outer end of said bucket lip while permitting easy removal from a mold.

8. The bucket and lid of claim 7 in which a mold parting line for said bucket is located at said outwardly-projecting apex of the bucket lip.

9. The bucket and lid of claim 4 in which said second annular wall is thicker than said first annular wall.

10. A plastic bucket having a lip at its mouth, said lip defining means for engaging a bucket lid in sealingly secured relation to said lip, the improvement comprising, in combination:

the interior wall of said bucket defining an annular, inwardly-projecting ridge positioned adjacent to but spaced from said lip, said ridge extending around the inner surface of said bucket and defining an annular, inwardly-pointed apex, to provide increased hoop strength to said bucket adjacent its mouth, said bucket lip also defining an annular, outwardly-projecting ridge extending around the outer circumference of said bucket lip and defining an annular, outwardly pointing apex, a surface of said bucket lip extending outwardly relative to the direction of said bucket mouth from said apex, being of generally planar, annular shape, said generally planar, annular surface and the outer end of said bucket lip being free of mold parting line marks for improved sealing characteristics.

11. The bucket of claim 10 in which a mold parting line mark is positioned at the outwardly-pointing, annular apex of the bucket lip.

12. The bucket of claim 10 in which a bucket lid is sealingly secure to said lip, said bucket lid defining inner and outer transverse annular walls to further define an annular locking slot therebetween, said outer wall defining an annular inwardly-extending projection removably engaging said outwardly projecting ridge, said inner wall defining an annular outwardly-facing projection for engaging an inner portion of said bucket lip.

13. The bucket of claim 10 in which said annular apex is positioned less than one inch from the outermost portion of said bucket lip, and said annular apex is essentially linear.

14. The bucket of claim 10 in which the surfaces of said inwardly projecting ridge extending from the annular apex to the interior wall of the bucket are concave in shape.

15. The bucket of claim 14 in which a bucket lid is sealingly secured to the lip of said bucket, the lip of said bucket being retained in a locking slot defined by inner and outer annular walls of said bucket lip, the inner annular wall also carrying an outwardly positioned annular projection defining a surface which faces the annular locking slot which defines an angle to the plane of said inner annular wall, said annular projection being in contacting and retaining relation with a mating projection of said bucket lip positioned within the locking slot, the inner walls also defining, below said outwardly-positioned annular projection, a surface which is of a shape complimentary to the shape of the side of the annular ridge which faces the mouth of said bucket, to form an annular, abutting, sealing surface between said outer side of the ridge and outer wall, and extending essentially to said apex, said outer annular wall defining an inwardly-positioned projection adapted to interlock with said annular projecting ridge, positioned within the locking slot.

16. A plastic bucket lid for attachment to the lip of a plastic bucket, said lid defining first, second and third transversely extending annular walls, the first and second annular walls forming between them an annular open depression, said second and third annular walls defining an annular locking slot outside of said depression and adapted to retain a plastic bucket lid in locked, sealingly secured relation, the first annular wall constituting an integral segment of the bucket lid, being connected at opposed sides to other portions of the bucket lid, said first annular wall being of less thickness than the second annular wall to facilitate preferential flexing by the first annular wall upon shock adjacent the bucket lip, causing said second wall to remain relatively immovable under such circumstances for improved sealing strength.

17. The bucket of claim 16 in which the second annular wall carries an outwardly-positioned annular projection defining a surface which faces the annular locking slot and which defines an angle of 80° to 100° to the plane of said second annular wall, said annular projection being adapted for contacting and retaining relation with the mating projection of said bucket lip positioned within said locking slot.

18. The plastic bucket lid of claim 17 in which said third annular wall defines an inwardly positioned projection adapted to interlock with an outwardly facing projection of said bucket lip positioned within the locking slot.

19. The plastic bucket of claim 18, carrying a lip of a plastic bucket within said locking slot, the interior wall of said bucket defining an annular, inwardly projecting ridge positioned adjacent to but spaced from said lip, said ridge extending around the inner circumference of said bucket and defining an annular, inwardly-pointed apex, said second wall defining a surface which is in intimate engagement with the side of said projecting ridge extending from adjacent said apex toward the bucket lip.

* * * * *